Patented Mar. 30, 1948

2,438,782

UNITED STATES PATENT OFFICE 2,438,782

CYANINE DYESTUFFS

John David Kendall, Ilford, England, assignor to Ilford Limited, Ilford, England, a British company No Drawing. Application April 9, 1943, Serial No. 482,493. In Great Britain April 23, 1942

6 Claims. (Cl. 260—240)

This invention relates to the manufacture of dyestuffs and particularly to the manufacture of dyestuffs which are capable of optically sensitising silver halide photographic emulsions.

In application Serial No. 482,494, filed on even date herewith, there is described the production of dyestuff intermediates of the general formula I:

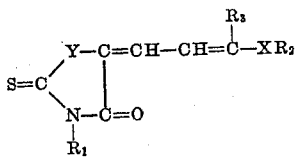

where X and Y each represent an oxygen atom or a sulphur atom, $R_1$ is a hydrogen atom or a hydrocarbon group and $R_2$ and $R_3$ are hydrocarbon groups.

According to the present invention, dyestuffs are produced by condensing a dyestuff intermediate of general formula I with an alkyl or aralkyl quaternary salt of a heterocyclic nitrogen compound of the thiazole, selenazole or quinoline series having, in the $\alpha$ or $\gamma$ position to the quaternary nitrogen atom, an external reactive methylene group (which includes an external methyl group or mono-substituted methyl group).

It is a remarkable property of the dyestuff intermediates of general formula I that not only is the $—XR_2$ group reactive but the $=S$ group is also reactive. In many cases, therefore, the condensation proceeds directly between one molecular equivalent of the compound of general formula I and two molecular equivalents of the second reagent to form a dyestuff which contains three heterocyclic nuclei. It is found that the tri-nuclear dyes are generally formed, if suitable quantities of the reagents are used, where the reaction is effected merely by heating the reagents together or where the reaction is effected in the presence of at most only a small quantity of a base, though where the second reagent is a quinoline type of compound di-nuclear dyestuffs are frequently formed.

In all cases di-nuclear dyes can be produced by using molecular equivalents of the reagents and effecting the reaction in the presence of excess of a strong base. Moreover, the di-nuclear dyestuffs can be converted to tri-nuclear dyestuffs by converting them to quaternary salts by treatment with an alkyl or aralkyl salt and condensing them with a molecular equivalent of a third reagent which may be the same as the second reagent; by using a third reagent different from (though of the same class as) the second reagent unsymmetrical types of dyestuff are produced.

The types of dyestuff which can be formed according to the present invention, by using an alkyl or aralkyl quaternary salt of a heterocyclic nitrogen compound of the thiazole, selenazole or quinoline series containing a reactive methylene group ($a$—$CH_2R_5$ group where $R_5$ is a hydrogen atom or a hydrocarbon group) in the $\alpha$ or $\gamma$ position to the quaternary nitrogen atom, are therefore as follows:

Compounds of the general formula II:

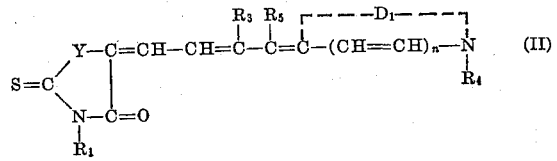

Compounds of the general formula III:

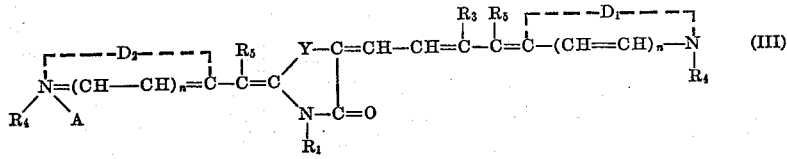

In general formulae II and III the symbol $R_4$ represents an alkyl or aralkyl group, A represents an acid radicle, $D_1$ and $D_2$ represent the residues of nuclei of the thiazole, selenazole or quinoline series, and $n$ is nought or 1.

Compounds of general formula II may be converted to compounds of general formula III by reacting the former compounds with an alkyl or aralkyl salt ($R_6A$) which converts the thio group ($=S$) to a thio ether group $—SR_6$, thus:

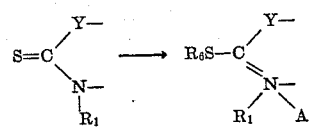

and reacting the resulting quaternary salt with a further molecular equivalent of an alkyl or aralkyl quaternary salt of a heterocyclic nitrogen compound of the thiazole, selenazole or quinoline series. The two stages in the process can be effected simultaneously in one stage if desired.

Heterocyclic nitrogen compounds which may be employed as quaternary salts may be, for example, the appropriately substituted thiazoles, selenazoles and their polycyclic homologues such as those of the benzene, naphthalene, acenaphthene and anthracene series, thiazolines and selenazolines quinoline and α and β naphthaquinolines and lepidines. The polycyclic compounds of these series may also be substituted in the carbocyclic rings with one or more groups such as alkyl, aryl, amino, hydroxy, alkoxy and methylene-dioxy groups or by halogen atoms. All of such compounds must, of course, contain the specified reactive methylene group.

As indicated above, the groups $R_1$, $R_2$, $R_3$ and $R_5$ may be hydrocarbon groups and this is to be understood to include alkyl, aryl and aralkyl groups and unsaturated hydrocarbon groups e. g. methyl, ethyl, propyl and higher alkyl groups, benzyl and naphthyl-methyl groups, phenyl and naphthyl groups, and allyl and cinnamyl groups. Such hydrocarbon groups may contain substituent groups, e. g., amino, hydroxy and alkoxy groups or may contain substituent halogen atoms. The groups $R_4$ and $R_6$ referred to in the foregoing formulae are alkyl or aralkyl groups and may be any of such groups mentioned above. The group $R_4$ is preferably an alkyl or hydroxyalkyl group.

The group A is an acid radicle and examples are halide groups, alkyl sulphate, p-toluene sulphonate, and perchlorate groups.

The following examples illustrate the invention but are not to be regarded as limiting it in any way:

Example 1

Preparation of the dyestuff of the formula:

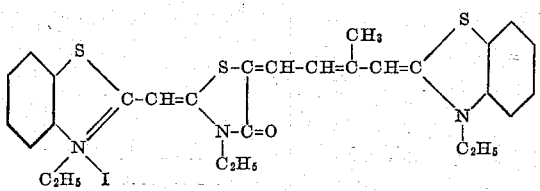

0.46 gm. of 2-thio-3-ethyl-4-keto-5-(γ-ethyl-thio-crotonylidene) tetrahydrothiazole and 1.02 gms. of 1-methyl benzthiazole ethiodide were warmed in 20 ccs. of ethyl alcohol to form a solution. 0.17 cc. of diethylamine was added and the solution was then gently warmed and then allowed to cool. The desired dyestuff separated and after recrystallisation from methyl alcohol solution was obtained as green crystals melting at 220° C. It gave a blue-green solution in methyl alcohol. This dyestuff may also be prepared by a similar procedure using 0.43 gm. of 2-thio-3-ethyl-4-keto-5-(γ-ethoxy-crotonylidene) tetrahydrothiazole, 1.02 gms. of 1-methyl benzthiazole ethiodide, 20 ccs. of ethyl alcohol and 0.46 cc. of triethylamine.

Example 2

Preparation of the dyestuff of the formula:

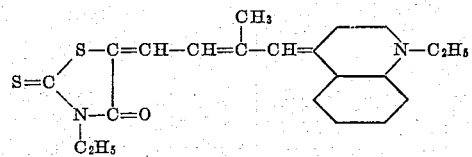

1.4 gms. of 2-thio-3-ethyl-4-keto-5-(γ-ethyl-thio-crotonylidene)-tetrahydro-thiazole and 3 gms. of lepidine ethiodide were dissolved in 40 ccs. of methyl alcohol and 1.02 ccs. of diethylamine were added. The solution was gently warmed and then allowed to cool. The desired dyestuff separated out and after washing with water, methyl alcohol and ether, had a melting point of 179° C.

Example 3

Preparation of the dyestuff of the formula:

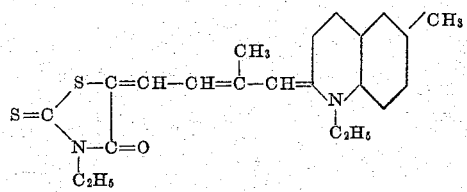

0.88 gm. of 2-thio-3-ethyl-4-keto-5-(γ-ethyl-thiocrotonylidene) tetrahydrothiazole and 2.08 gms. of p-toluquinaldine ethiodide were dissolved in 30 ccs. of ethyl alcohol by gentle warming and 1.02 ccs. of diethylamine were added. The resulting solution was warmed for 2-3 minutes and then allowed to cool. The desired dyestuff separated and after washing with ethyl alcohol, water and ether, was obtained as crystals melting at 207° C.

Example 4

Preparation of the dyestuff of the formula:

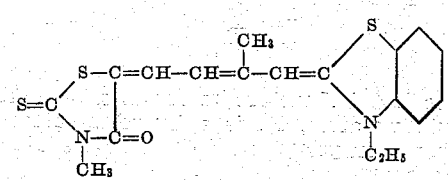

2.1 gms. of 2-thio-3-methyl-4-keto-5-(γ-ethyl-thio-crotonylidene)-tetrahydrothiazole and 2.4 gms. of 1-methyl benzthiazole ethiodide were dissolved in 40 ccs. ethyl alcohol by gentle warming. To the resulting solution was added 3.17 ccs. of diethylamine and the solution was then heated for ten minutes on a water bath and then allowed to cool. The desired dyestuff separated and after washing was obtained as crystals melting at 255° C. It gave a purple-blue solution in methyl alcohol.

In this example a dinuclear dyestuff is obtained as a result of the use of a large excess of diethylamine.

Example 5

Preparation of the dyestuff of the formula:

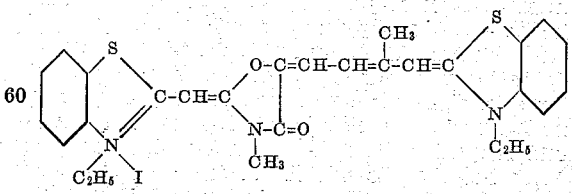

0.4 gm. of 2-thio-3-methyl-4-keto-5-(γ-ethyl-thio-crotonylidene-tetrahydro-oxazole and 1.02 gms. of 1-methyl benzthiazole ethiodide were dissolved in 20 ccs. of ethyl alcohol by gentle warming, and 0.46 cc. of triethylamine were added. The resulting solution was heated on a water bath for 15 minutes and then cooled. The desired dyestuff crystallised out and after washing with water, ethyl alcohol and ether was obtained as crystals melting at 218° C. decomposition.

Example 6

Preparation of the dyestuff of the formula:

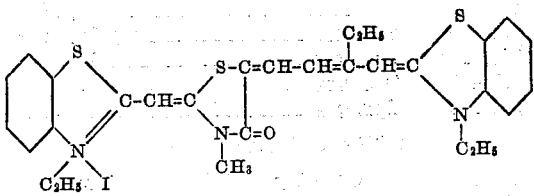

0.54 gm. of 2-thio-3-methyl-4-keto-5-(γ-ethyl-γ-ethylthio-allylidene)-tetrahydro-thiazole, 1.52 gms. of 1-methyl-benzthiazole ethiodide and 15 ccs. of ethyl alcohol were warmed together and 0.2 cc. of diethylamine was added. A green-blue colour appeared almost immediately and heating was continued for 10 minutes. The blue solution was then cooled and the precipitated dye washed with ethyl alcohol, hot water, hot benzene ethyl alcohol and ether. It crystallised from methyl alcohol as green crystals. Melting point 180° C.

Example 7

Preparation of the dyestuff of the formula:

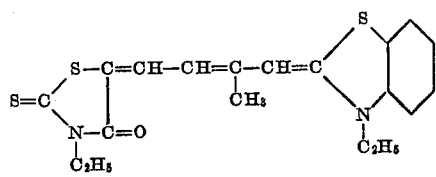

The preparation was effected as in Example 4 using 7 gms. of 2-thio-3-ethyl-4-keto-5-(γ-ethylthio-crotonylidene)-tetrahydrothiazole, 12.32 gms. of 1-methyl benzthiazole ethiodide, 11.1 ccs. of diethylamine and 140 ccs. of ethyl alcohol. The dye was boiled out with methyl alcohol and thus obtained as crystals, M. P. 185° C.

As already indicated, the dyestuffs of this invention are optical sensitisers for silver halide photographic emulsions. Thus, the dyestuffs of the foregoing specific examples when incorporated in gelatino-silver iodo-bromide emulsions impart to such emulsions sensitivity in the red and far-red regions of the spectrum.

Thus the sensitising maxima of the dyestuffs of the foregoing examples in a gelatino-silver iodobromide emulsion are as follows:

Example 1: Sensitising maximum at 7600 Å.
Example 2: Sensitising maximum at 7600 Å.
Example 3: Sensitising maximum at 7300 Å.
Example 4: Sensitising maximum at 7100 Å.
Example 5: Sensitising maximum at 7200 Å.

What I claim is:

1. Process for the production of dyestuffs which comprises condensing a dyestuff intermediate of the general formula:

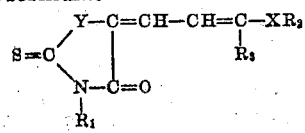

where X and Y are each selected from the class consisting of oxygen atoms and sulphur atoms, $R_1$ is selected from the class consisting of the hydrogen atom and hydrocarbon groups, and $R_2$ and $R_3$ are each hydrocarbon groups, with a second reagent which is a compound selected from the class consisting of alkyl and aralkyl quaternary salts of heterocyclic nitrogen compounds of the thiazole, selenazole and quinoline series having in one of the α and γ positions to the heterocyclic nitrogen atom a substituent reactive methylene group.

2. Process according to claim 1 wherein the reagents are used in the proportion of one molecular equivalent of the said dyestuff intermediate to at least two molecular proportions of the said second reagent, and the reaction is effected in the presence of at most only a small quantity of a base.

3. Process according to claim 1 wherein the reagents are used in substantially equimolecular proportions and the reaction is effected in the presence of a strong base in a quantity in excess of that necessary to react with any acid by-products of the reaction.

4. Dyestuffs of the general formula:

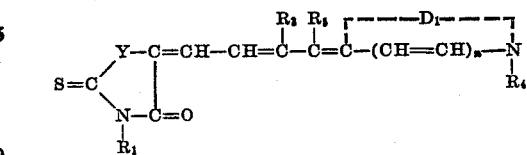

where $R_1$ and $R_5$ are each selected from the class consisting of the hydrogen atom and hydrocarbon groups, $R_3$ is a hydrocarbon radicle, $R_4$ is selected from the class consisting of alkyl and aralkyl groups, Y is selected from the class consisting of oxygen atoms and sulphur atoms, $n$ is selected from the class consisting of nought and one, and $D_1$ is a residue selected from the class consisting of thiazole, selenazole and quinoline residues.

5. Dyestuffs of the general formula:

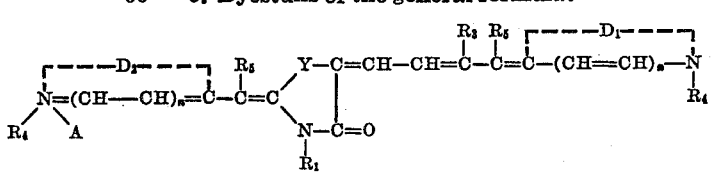

where $R_1$ and $R_5$ are each selected from the class consisting of the hydrogen atom and hydrocarbon groups, $R_3$ is a hydrocarbon radicle, $R_4$ is selected from the class consisting of alkyl and aralkyl groups, Y is selected from the class consisting of oxygen atoms and sulphur atoms, $n$ is selected from the class consisting of nought and one, and $D_1$ and $D_2$ are each residues selected from the class consisting of thiazole, selenazole and quinoline residues.

6. Dyestuffs of the general formula:

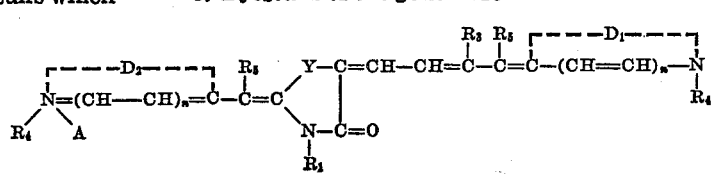

where $R_1$ and $R_5$ are each selected from the class consisting of the hydrogen atom and hydrocarbon groups, $R_3$ is a hydrocarbon radicle, $R_4$ is selected from the class consisting of alkyl and aralkyl groups, Y is selected from the class consisting of oxygen atoms and sulphur atoms, $n$ is selected from the class consisting of nought and one, and $D_1$ and $D_2$ are different residues selected from the class consisting of thiazole, selenazole and quinoline residues.

JOHN DAVID KENDALL.

REFERENCES CITED

The following references are of record in the file of this patent:

UNITED STATES PATENTS

| Number | Name | Date |
|---|---|---|
| 2,078,233 | Brooker | Apr. 27, 1937 |
| 2,131,865 | Zeb | Oct. 4, 1938 |
| 2,170,803 | Brooker | Aug. 29, 1939 |
| 2,177,401 | Brooker | Oct. 24, 1939 |
| 2,177,402 | Brooker | Oct. 24, 1939 |
| 2,263,018 | Sprague | Nov. 18, 1941 |

FOREIGN PATENTS

| Number | Country | Date |
|---|---|---|
| 46,810 | France (Addition to 793,722) | 1936 |
| 509,927 | Great Britain | 1939 |
| 218,381 | Switzerland | Apr. 1942 |